United States Patent
Mansour et al.

(10) Patent No.: US 11,966,772 B1
(45) Date of Patent: Apr. 23, 2024

(54) SYSTEM, METHOD, AND COMPUTER PROGRAM FOR USING SERVICE BROKERS TO MANAGE THE LIFECYCLE OF BACKING SERVICES

(71) Applicant: Amdocs Development Limited, Limassol (CY)

(72) Inventors: Edwar Adib Mansour, Upper Galilee (IL); Yuri Khrakovski, Ashkelon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 45 days.

(21) Appl. No.: 17/685,254

(22) Filed: Mar. 2, 2022

(51) Int. Cl.
  *G06F 3/00* (2006.01)
  *G06F 9/48* (2006.01)
  *G06F 9/54* (2006.01)

(52) U.S. Cl.
  CPC .............. *G06F 9/485* (2013.01); *G06F 9/54* (2013.01)

(58) Field of Classification Search
  CPC ............................... G06R 9/541; G06F 9/541
  USPC ........................................................ 719/310
  See application file for complete search history.

(56) References Cited

U.S. PATENT DOCUMENTS

| | | | | |
|---|---|---|---|---|
| 2007/0260723 | A1* | 11/2007 | Cohen | G06Q 10/00 709/223 |
| 2012/0158821 | A1* | 6/2012 | Barros | G06F 9/5055 707/769 |
| 2015/0363282 | A1* | 12/2015 | Rangasamy | G06F 11/2033 714/4.12 |
| 2016/0065417 | A1* | 3/2016 | Sapuram | H04L 41/50 709/223 |
| 2016/0226663 | A1* | 8/2016 | Jones | G06F 21/121 |
| 2017/0187785 | A1* | 6/2017 | Johnson | H04L 51/42 |
| 2020/0301759 | A1* | 9/2020 | Vaddi | G06F 11/1433 |
| 2021/0067512 | A1* | 3/2021 | Polepalli Yeshwanth | H04L 63/10 |
| 2022/0110060 | A1* | 4/2022 | Yang | H04W 76/14 |
| 2022/0191151 | A1* | 6/2022 | Klosterman | H04L 47/781 |

OTHER PUBLICATIONS

Towards a Cloud Service Broker for the Meta-CloudCarlos, (Year: 2012).*
Victoria Paulsson, Cloud Service Brokerage: A systematic literature review using a software development lifecycle . (Year: 2016).*

* cited by examiner

*Primary Examiner* — Lechi Truong
(74) *Attorney, Agent, or Firm* — Zilka-Kotab, P.C.

(57) ABSTRACT

As described herein service brokers are used to manage the lifecycle of backing services. In use, a service catalog of backing services available for use by an application is provided. Further, one or more service brokers are used to manage a lifecycle of the backing services.

15 Claims, 15 Drawing Sheets

SYSTEM, METHOD, AND COMPUTER PROGRAM FOR USING SERVICE BROKERS TO MANAGE THE LIFECYCLE OF BACKING SERVICES

FIELD OF THE INVENTION

The present invention relates to management of backing services.

BACKGROUND

Backing services are processes that an application contacts over a network during its operation. Typically, backing services are provided by external entities, and an application developer will be required to have detailed knowledge about how those backing services are created or managed in order to design the application to be able to access the backing services. For example, backing services may include cloud services provided by one or more cloud providers on one or more cloud platforms.

There is thus a need for addressing these and/or other issues associated with the prior art. For example, standardized access to external managed backing services is needed to simplify the manner in which backing services are exposed to applications and application deployment tooling.

SUMMARY

As described herein, a system, method, and computer program are provided for using service brokers to manage the lifecycle of backing services. In use, a service catalog of backing services available for use by an application is provided. Further, one or more service brokers are used to manage a lifecycle of the backing services.

DETAILED DESCRIPTION

Figure 1:
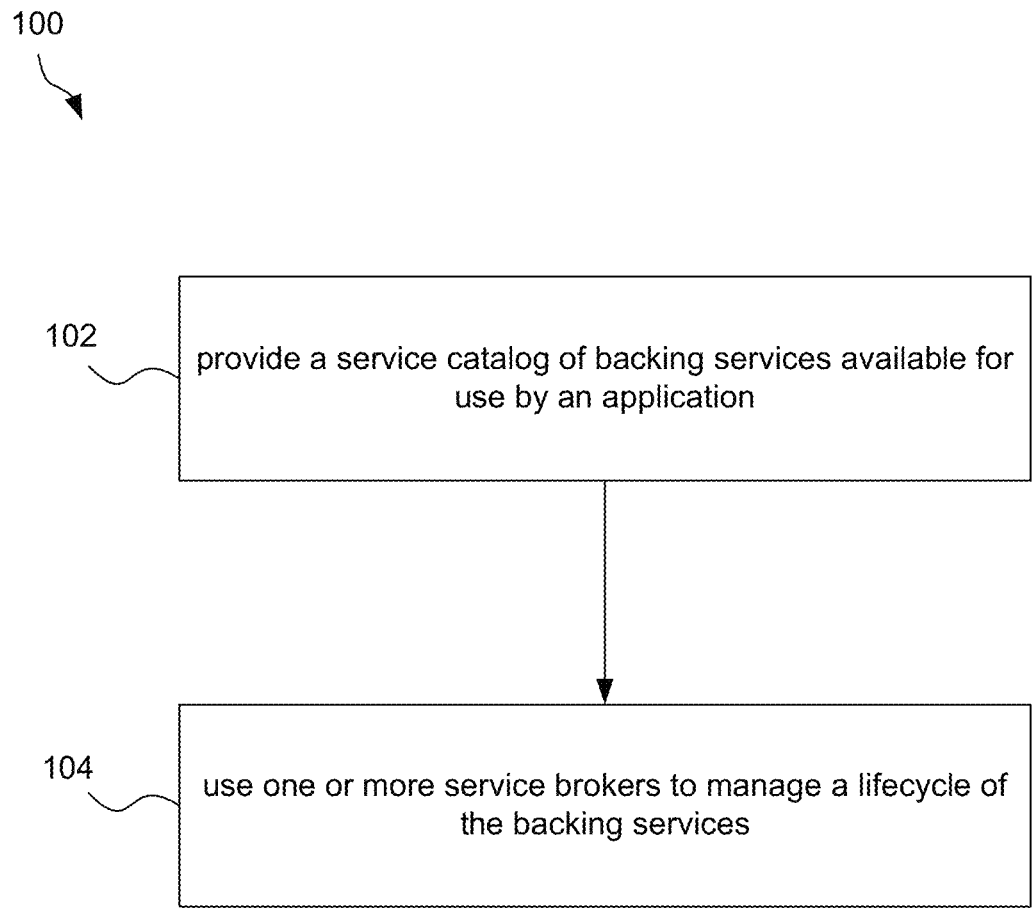
FIG. 1 illustrates a method for using service brokers to manage the lifecycle of backing services, in accordance with one embodiment.

FIG. 1 illustrates a method 100 for using service brokers to manage the lifecycle of backing services, in accordance with one embodiment. The method 100 may be performed by any computer system(s) described below with respect to FIGS. 14 and/or 15. For example, the method 100 may be performed by a computer system or associated platform that enables applications to use backing services.

In operation 102, a service catalog of backing services available for use by an application is provided. With respect to the present description, a backing service refers to a process that an application can contact, access, etc. (e.g. over a network) during its operation. Backing services may be provided by external entities (e.g. cloud providers), and accordingly may be referred to as externally managed services, microservices, applications, etc.

The service catalog refers to any data structure that identifies (i.e. indicates) backing services available for use by applications. The service catalog may describe all of the backing services that can be provisioned through the one or more services brokers. The service catalog may also describe any existing plans for the backing services. Plans typically represent the costs and benefits for a given variant of a backing service, and may be represented as "small", "medium", and "large."

In an embodiment, the service catalog may be an extension application programming interface (API) that enables access to the backing services. For example, in one implementation the service catalog may be an extension API that enables applications running in Kubernetes clusters to easily use backing services, including external managed software offerings such as a datastore service offered by a cloud provider. The API provides functionality to list, provision, and bind with backing services from service brokers, without necessarily requiring detailed knowledge about how those services are created or managed.

In operation 104, one or more service brokers are used to manage a lifecycle of the backing services. A service broker refers to a data structure that is configured to be used to manage a lifecycle of the backing services. In an embodiment, the service brokers may each be an API configured to manage the lifecycle of a different subset of the backing services.

For example, each service broker may be an implementation of an open-source Open Service Broker (OSB) API which simplifies the delivery of backing services to applications (e.g. that run on Kubernetes). The service brokers may provide a consistent model for exposing the backing services to applications and application deployment tooling. Further, the service brokers may simplify and standardize access to the backing services.

In particular, the service brokers may decouple the backing services from applications that use the backing services. It should be noted that in the context of the present description, an application may refer to a computer program, a service, a microservice, or any other computer code that is configured to use, access, etc. the functionality of one or more backing services.

As noted above, the service brokers are used to manage a lifecycle of the backing services. In an embodiment, this lifecycle may include provisioning a backing service instance for use by an application. In another embodiment, the lifecycle may include creating a service binding that connects the backing service instance to the application. In yet another embodiment, the lifecycle may include deprovisioning the backing service instance.

As a further option, the service brokers may also be used to generate, from the service catalog, a list of a subset of the backing services that the service broker offers. As an even further option, the service brokers may provide a security model for the backing services. Such security model may provide infrastructure for authentication and authorization. For example, the service brokers may provide the security model by creating a client certificate for each application that uses the backing services.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
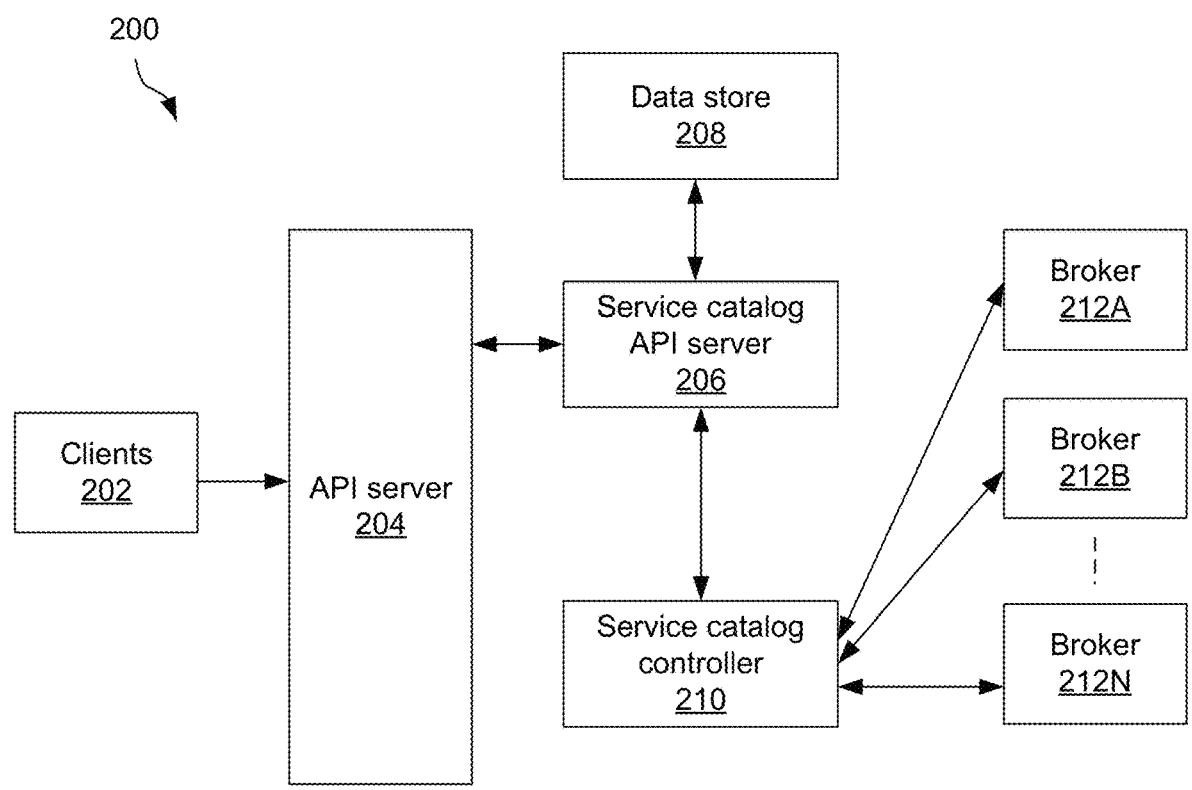
FIG. 2 illustrates a system for using service brokers to manage the lifecycle of backing services, in accordance with one embodiment.

FIG. 2 illustrates a system 200 for using service brokers to manage the lifecycle of backing services, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, clients 202 communicate with an API server 204 to access backing microservices. The clients 202 may have applications installed thereon that are configured to use the backing microservices. The API server 204 communicates with a service catalog API server 206 that provides functionality to list, provision, and bind with backing services from service brokers 212A-N. The service catalog API server 206 also communicates with a data store 208 which stores any data that needs to be accessed (e.g. by a distributed system or cluster of machines).

A service catalog controller 210 is provided as an interface between the service catalog API server 206 and the service brokers 212A-N. The service catalog controller can cause the service brokers 212A-N to provision instances of the backing services identified from the service catalog API server 206, as required by the clients 202.

In one exemplary implementation, the API server 204 may be a Kubernetes API server. With regard to this implementation, the API server 204 may also receive communications from a kubectl (as a client 202) and the data store 208 may be an etcd. Also with respect to this implementation, the service brokers 212A-N may be OSB brokers.

In other exemplary implementations, the service brokers 212A-N may include:

Amdocs Microservice 360 (MS360) Platform Service Broker—an interface between a microservice owning a Kafka topic and the Apache Kafka® backing service. It decouples the microservice from the Kafka backing services it uses.

MS360 Platform CouchBase Service Broker—an interface between a microservice owning a bucket and the couchBase backing service. It decouples the microservice from the couchbase backing services it uses.

MS360 Platform Elasticsearch Service Broker—an interface between a microservice owning an index and the Elasticsearch backing service. It decouples the microservice from the elasticsearch backing services it uses.

MS360 Platform Postgres Service Broker—an interface between a microservice owning a database instance/schema and the postgres backing service. It decouples the microservice from the postgres backing services it uses.

Each service broker 212A-N may manage the backing services of different providers (e.g. cloud providers), such as the backing services of Amazon Web Services™ (AWS™) and/or the backing services of virtual machines, containers, etc.

Figure 3:
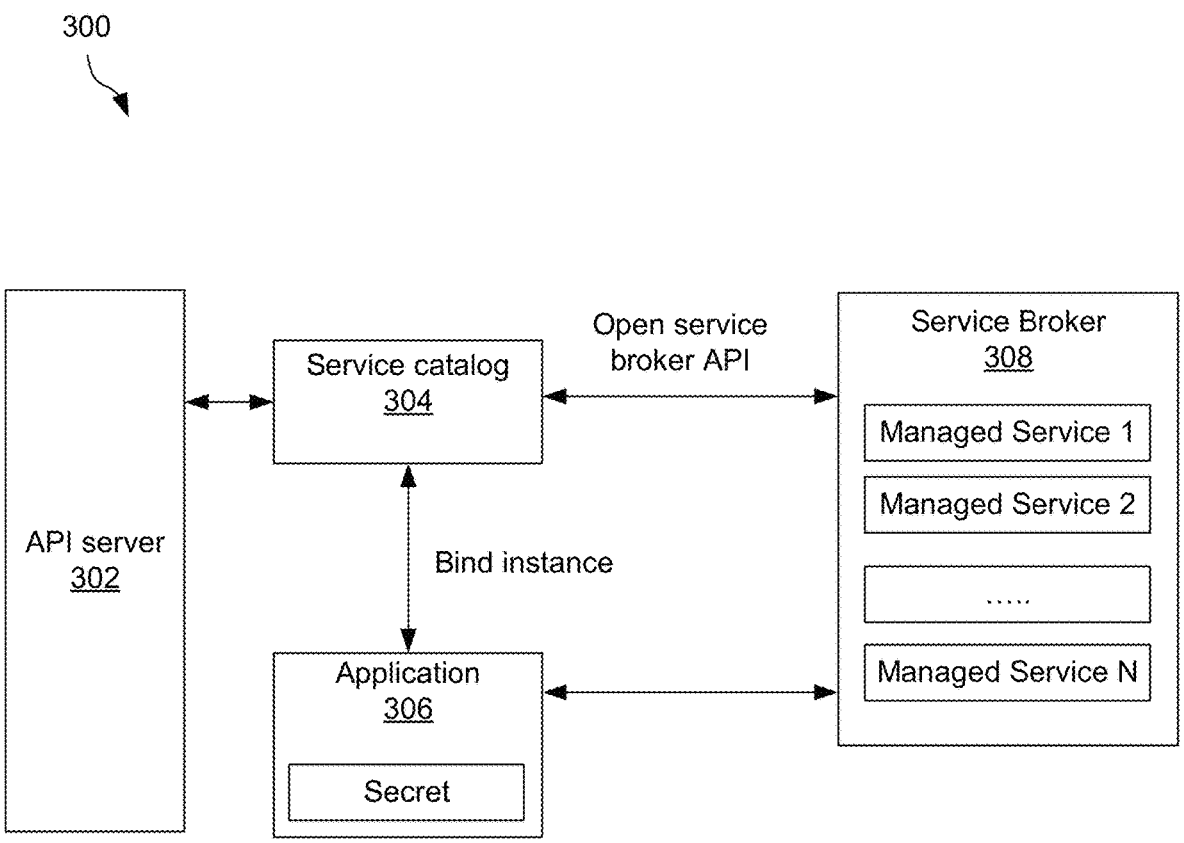
FIG. 3 illustrates a system for using a service broker to manage backing services for an application, in accordance with one embodiment.

FIG. 3 illustrates a system 300 for using a service broker to manage backing services for an application, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

As shown, an API server 302 communicates with a service catalog 304. In one implementation, the service catalog 304 may be a MS360 Platform Service catalog. The service catalog 304 defines functionality for:

(1) Fetching the catalog of backing services that a service broker offers: The catalog describes all of the services that can be provisioned through a service broker, and each service is made up of plans. Plans typically represent the costs and benefits for a given variant of the service. Many services use plans to 'T-Shirt size' the service offering (such as "small", "medium", and "large").

(2) Provisioning new service instances: A service instance is a provisioned instance of a service and plan as described in the service broker's catalog.

In other words, a service instance may be a provisioned instance of a cluster service class. When a user wants to use the capability provided by a service class, they can create a new service instance. When a new ServiceInstance resource is created, the service catalog controller connects to the appropriate cluster service broker and instructs it to provision the service instance.

(3) Connecting and disconnecting applications and containers from those service instances: Once a service instance is provisioned, you'll want your application or container to start communicating with that instance. From a service broker's perspective, this is called a service binding.

A service binding is a link between a service instance and an application. These are created by cluster users who wish for their applications to reference and use a service instance. Upon creation, the service catalog controller creates a Kubernetes secret containing connection details and credentials for the service instance. Such secrets can be mounted into pods as usual.

(4) Deprovisioning service instances: This action simply deletes all the resources created upon the initial provisioning of the service instance.

The service catalog 304 communicates with a service broker 308 via an API (shown as "open service broker API"). The service broker 308 manages the backing services (shown as "managed service") for an application 306. Part of the management includes provisioning instances of the backing services, binding the application 306 to the backing services instances, and providing a security model for the backing services (shown as a "secret" for the application 306).

Figure 4:
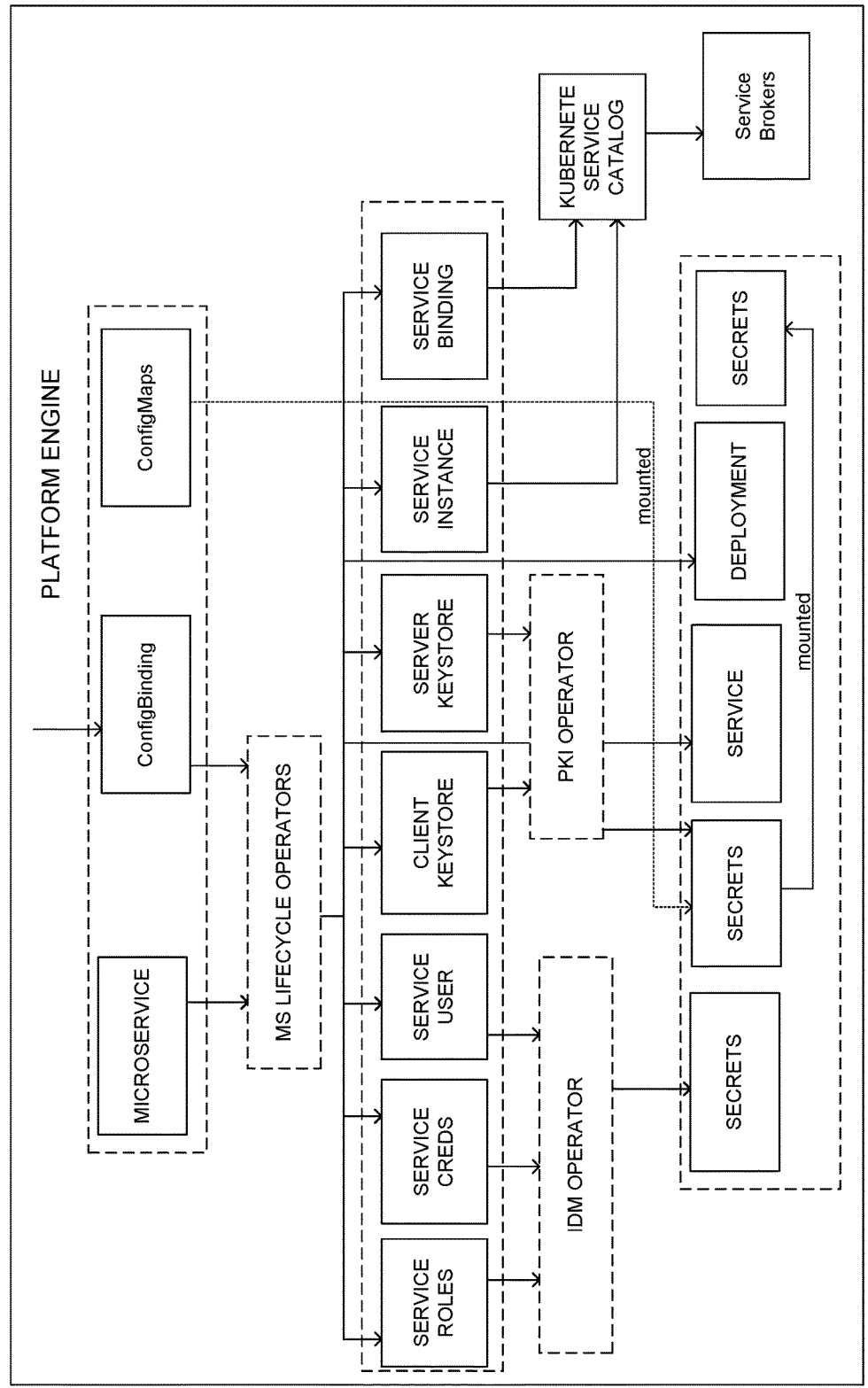
FIG. 4 illustrates a logical view of a platform using a service catalog and service brokers to manage the lifecycle of backing services, in accordance with one embodiment.

FIG. 4 illustrates a logical view of a platform 400 using a service catalog and service brokers to manage the lifecycle of backing services, in accordance with one embodiment. As an option, the platform 400 may be implemented in the context of the details of the previous figure and/or any subsequent figure(s). Of course, however, the platform 400 may be implemented in the context of any desired environment. Further, the aforementioned definitions may equally apply to the description below.

As shown, microservices, as well as their respective config bindings and config maps, are provided. The microservices may be examples of backing services, in the present embodiment. Microservice lifecycle operators are used to implement components for each of the microservices, including service roles, service credentials, service users, a client keystore, a server keystore, a service instance, and a service binding. In the context of the present description, an "operator" is an application-specific controller that can be used to perform various functionality in association with an application.

As described above with reference to the system 300 of FIG. 3, the service instance and the service binding are managed using a service broker, via the service catalog. The service broker also provides a security model for the backing services (shown as a "secrets"). The security model is tied to the service roles, service credentials, and service users, using an identity management (IDM) operator. The client keystore and the server keystore are also tied to the security model, using a public key infrastructure (PKI) operator.

Figure 5:
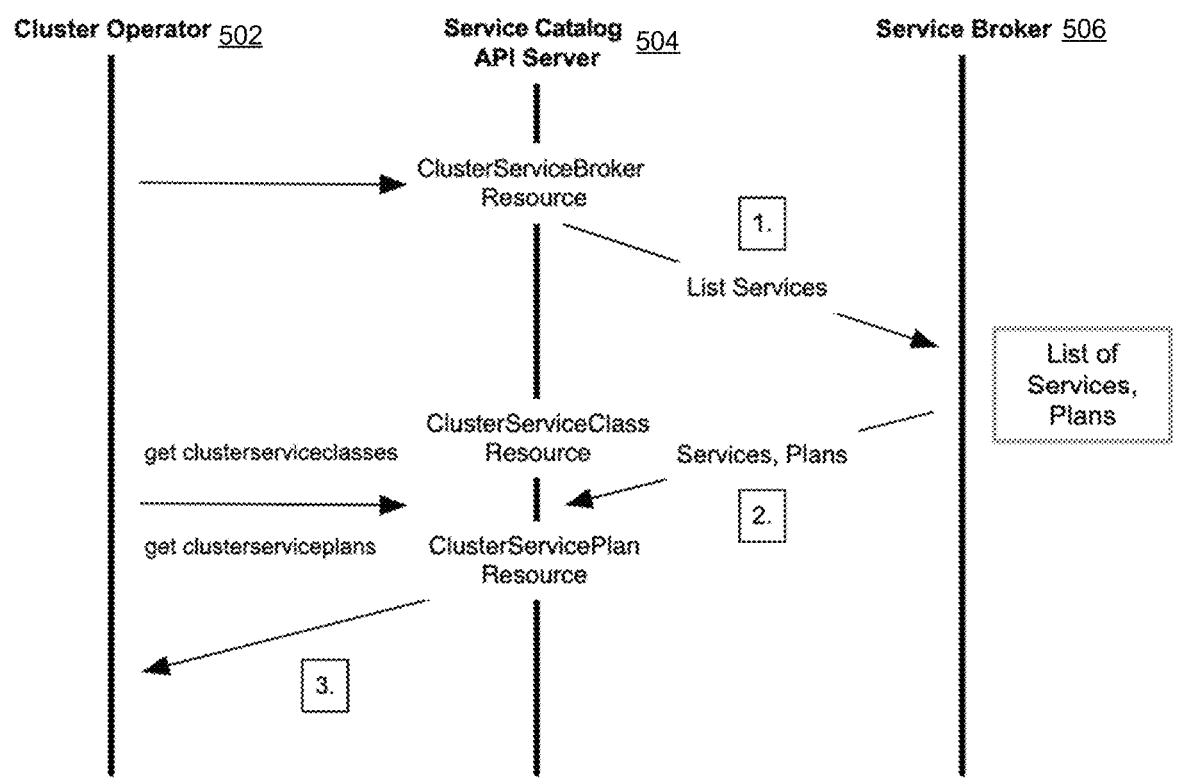
FIG. 5 illustrates a sequence flow diagram for listing backing services and plans available from a service broker, in accordance with one embodiment.

FIG. 5 illustrates a sequence flow diagram 500 for listing backing services and plans available from a service broker, in accordance with one embodiment. As an option, the sequence flow diagram 500 may be carried out in the context of the details of the previous figure and/or any subsequent figure(s). Of course, however, the sequence flow diagram 500 may be carried out in the context of any desired environment. Further, the aforementioned definitions may equally apply to the description below.

A cluster operator 502 (operating a cluster for an application) communicates with a service catalog API server 504 to access a cluster service broker resource. As shown in Step 1, the service catalog API server 504 communicates with the service broker 506 to request a list of the services and corresponding plans managed by the service broker 506. In Step 2, the service broker 506 sends the requested list to the service catalog API server 504. In Step 3, the cluster operator 502 communicates with the service catalog API server 504 to retrieve the service class resources and the service plan resources, as indicated in the list of the services and corresponding plans managed by the service broker 506.

Figure 6:
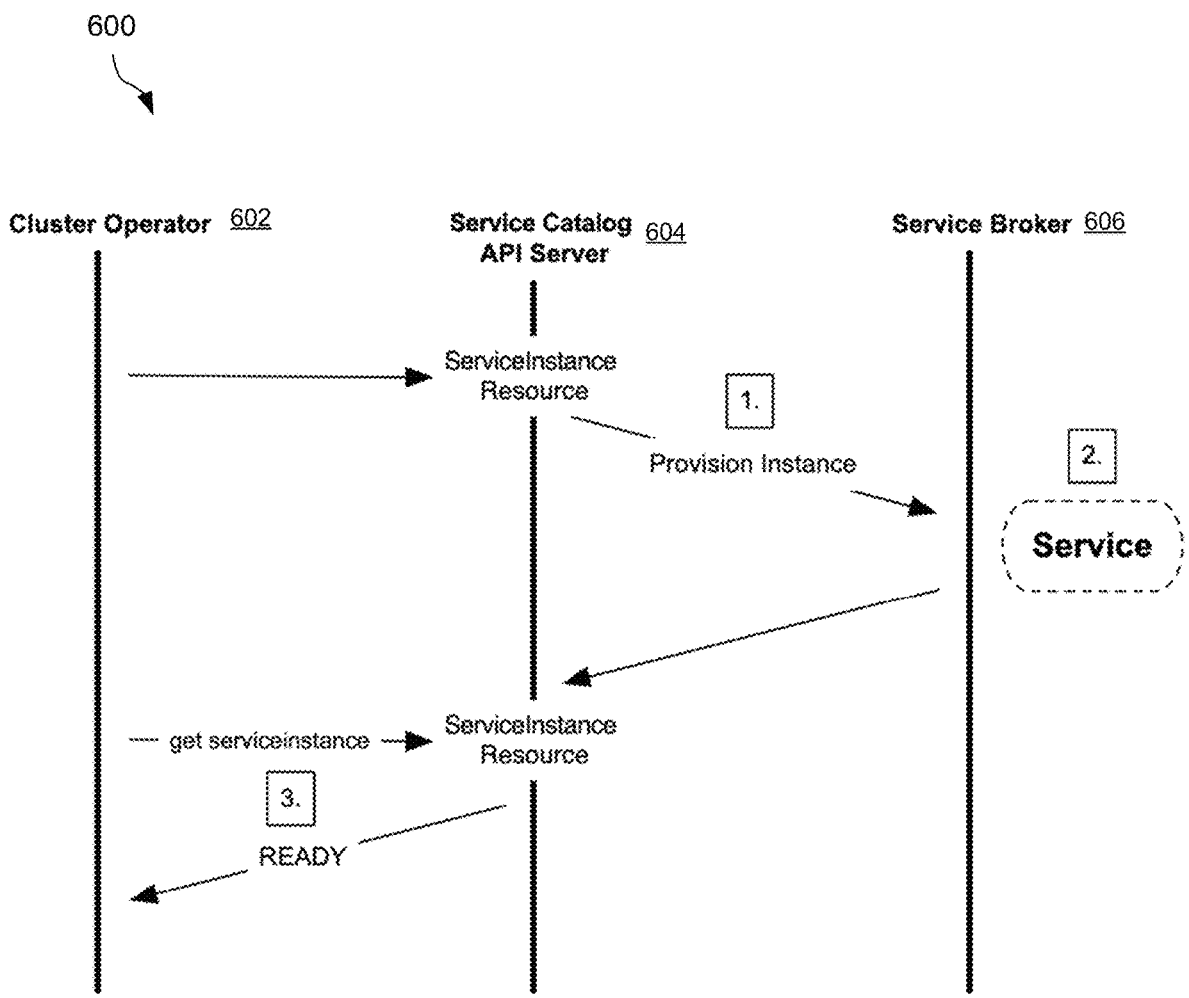
FIG. 6 illustrates a sequence flow diagram for provisioning a new instance of a backing service, in accordance with one embodiment.

FIG. 6 illustrates a sequence flow diagram 600 for provisioning a new instance of a backing service, in accordance with one embodiment. As an option, the sequence flow diagram 600 may be carried out in the context of the details of the previous figure and/or any subsequent figure(s). Of course, however, the sequence flow diagram 600 may be carried out in the context of any desired environment. Further, the aforementioned definitions may equally apply to the description below.

A cluster operator 602 (operating a cluster for an application) communicates with a service catalog API server 604 to provision a new instance of a service. In Step 1, the service catalog API server 604 instructs a service broker 606 that manages the service to provision the new instance. The service broker 606 may accordingly provision the new instance of the service.

In Step 2, the service broker 606 notifies the service catalog API server 604 of the new instance that has been provisioned. In Step 3, the cluster operator 602 is notified by the service catalog API server 604 that the new instance is ready.

Figure 7:
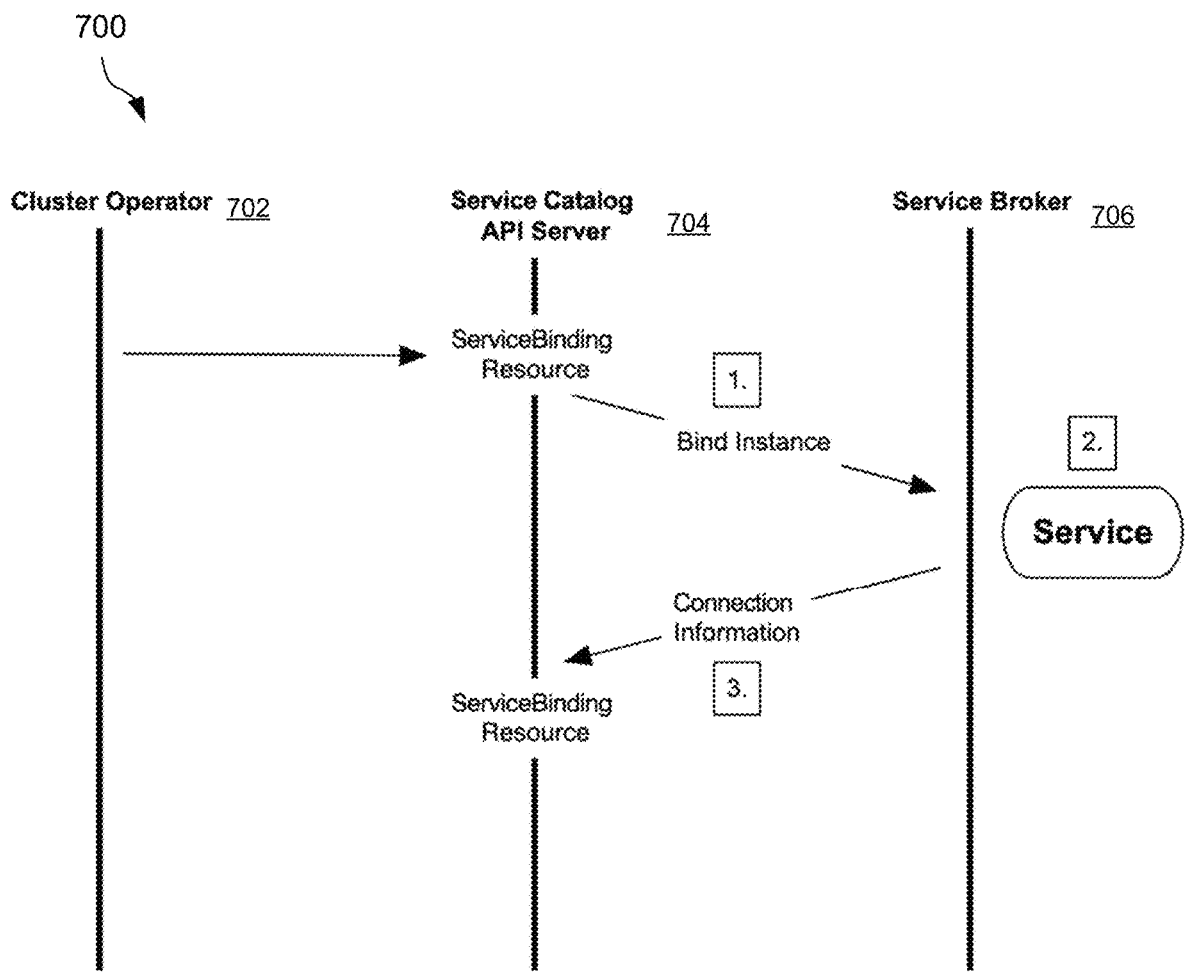
FIG. 7 illustrates a sequence flow diagram for binding to a new instance of a backing service, in accordance with one embodiment.

FIG. 7 illustrates a sequence flow diagram 700 for binding to a new instance of a backing service, in accordance with one embodiment. As an option, the sequence flow diagram 700 may be carried out in the context of the details of the previous figure and/or any subsequent figure(s). Of course, however, the sequence flow diagram 700 may be carried out in the context of any desired environment. Further, the aforementioned definitions may equally apply to the description below.

A cluster operator 702 (operating a cluster for an application) communicates with a service catalog API server 704 to bind a new instance of a backing service to an application. In Step 1, the service catalog API server 704 instructs the service broker 706 to bind the new instance to the application. In Step 2, this instruction causes the service broker 706 to bind the new instance to the application. In Step 3, the service broker 706 sends connection information associated with the binding to the service catalog API server 704.

Figure 8:
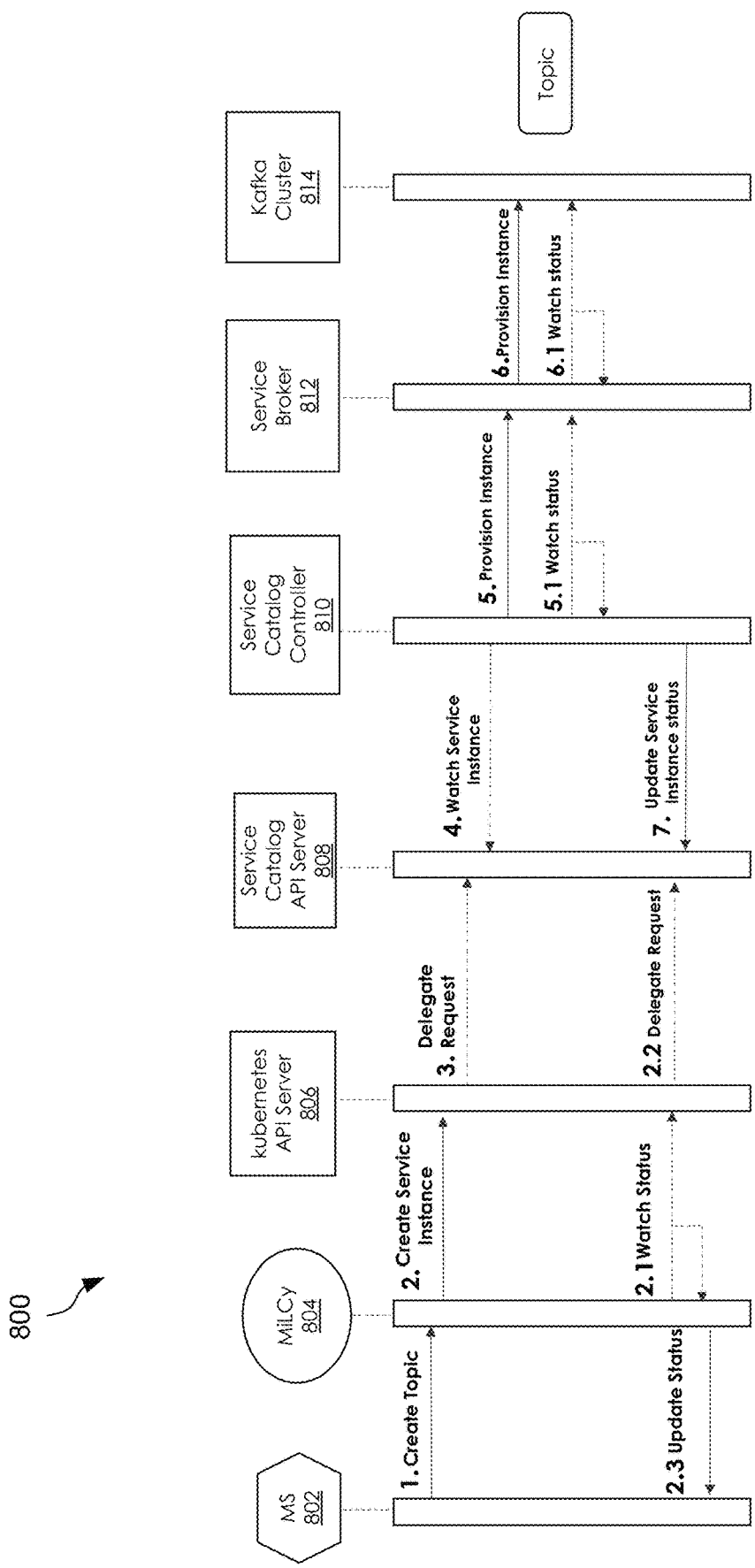
FIG. 8 illustrates a sequence flow diagram for creating a Kafka topic, in accordance with one embodiment.

FIG. 8 illustrates a sequence flow diagram 800 for creating a Kafka topic, in accordance with one embodiment. As an option, the sequence flow diagram 800 may be carried out in the context of the details of the previous figure and/or any subsequent figure(s). Of course, however, the sequence flow diagram 800 may be carried out in the context of any desired environment. Further, the aforementioned definitions may equally apply to the description below.

In Step 1, a microservice 802 creates a Kafka topic (i.e. a category/feed name to which records are stored and published). In Step 2, a microservice lifecycle (MiLCy) operator 804 requests creation of a new service instance. In Step 2.1, the MiLCy operator 804 sets a watch with a Kubernetes API server 806 for a status of the new service instance. In Step 2.2, the Kubernetes API server 806 similarly sets a watch for delegating the request to a service catalog API server 808. In Step 3, a Kubernetes API server 806 delegates the request to a service catalog API server 808. The Kubernetes API server 806 in turn (Step 4) sends a watch for the service instance to a service catalog controller 810. In Step 5, the service catalog controller 810 instructs a service broker 812 to provision the service instance.

In Step 6, the service broker 812 provisions the service instance with a Kafka cluster 814. In Step 6.1 and 5.1 respectively, a status of the newly provisioned service instance is sent back to the service broker 812 and the service catalog API server 808. In Step 7, an update to the service instance status is sent from the service catalog API server 808 to the Kubernetes API server 806. Based on the watches set in Steps 2.1 and 2.2, the service instance status is sent to the microservice 802 in Step 2.3.

Figure 9:
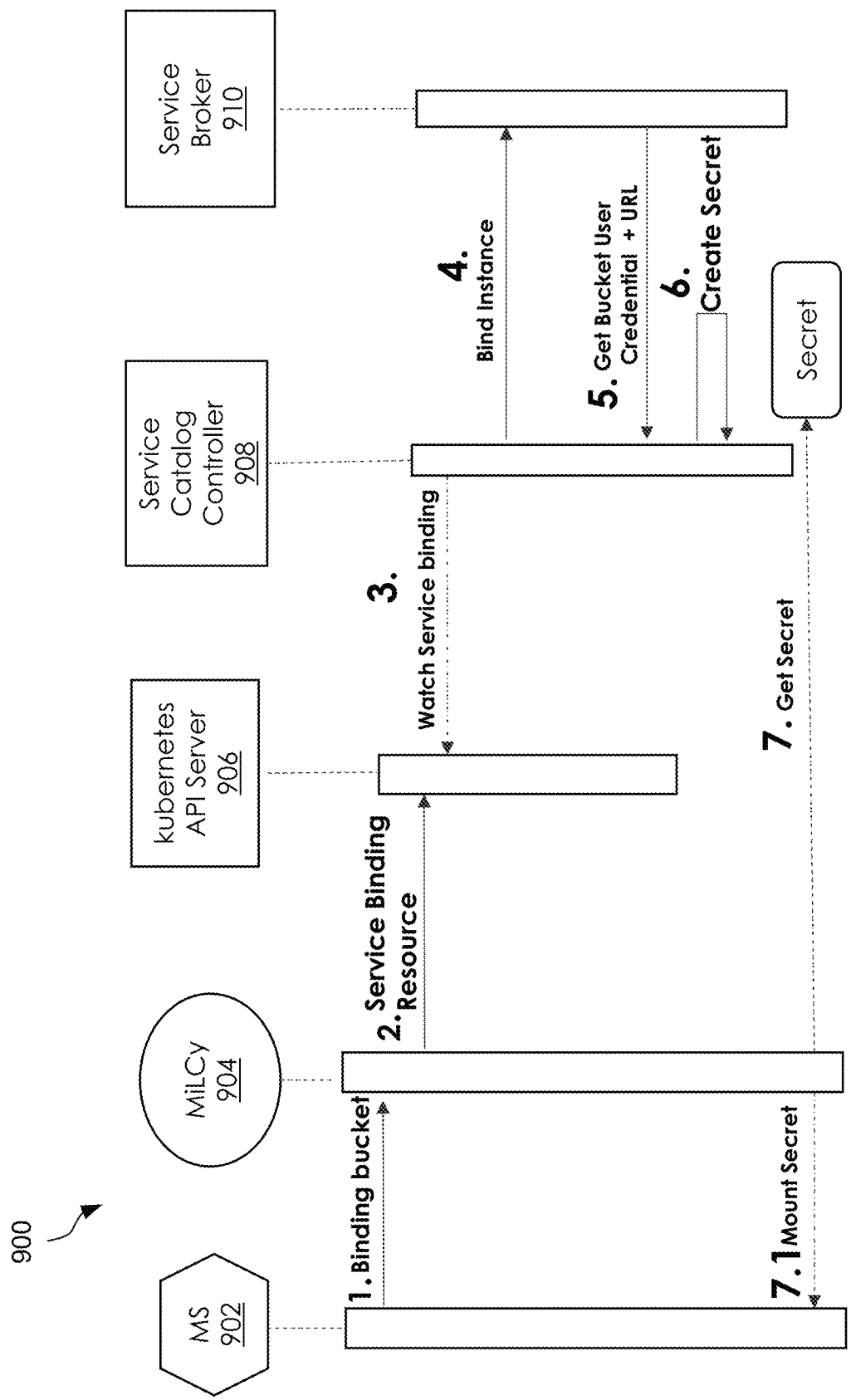
FIG. 9 illustrates a sequence flow diagram for binding a Couchbase bucket, in accordance with one embodiment.

FIG. 9 illustrates a sequence flow diagram 900 for binding a Couchbase bucket, in accordance with one embodiment. As an option, the sequence flow diagram 900 may be carried out in the context of the details of the previous figure and/or any subsequent figure(s). Of course, however, the sequence flow diagram 900 may be carried out in the context of any desired environment. Further, the aforementioned definitions may equally apply to the description below.

In Step 1, a microservice 902 sends a request for a binding bucket to a MiLCy operator 904. In Step 2, the MiLCy operator 904 sends a request for a service binding resource to a Kubernetes API server 906. In Step 3, the Kubernetes API server 906 sets a watch for the service binding with a service catalog controller 908. The service catalog controller 908, in turn (Step 4), instructs a service broker 910 to bind the service instance, which causes the service broker 910 to creating a binding for the microservice.

In Step 5, the service broker 910 gets from the service catalog controller 908 a bucket user credential and uniform resource locator (URL), and in Step 6 service catalog controller 908 creates a secret. In Step 7, the MiLCy operator 904 gets the secret. In Step 7.1, the microservice 902 mounts the secret.

Figure 10:
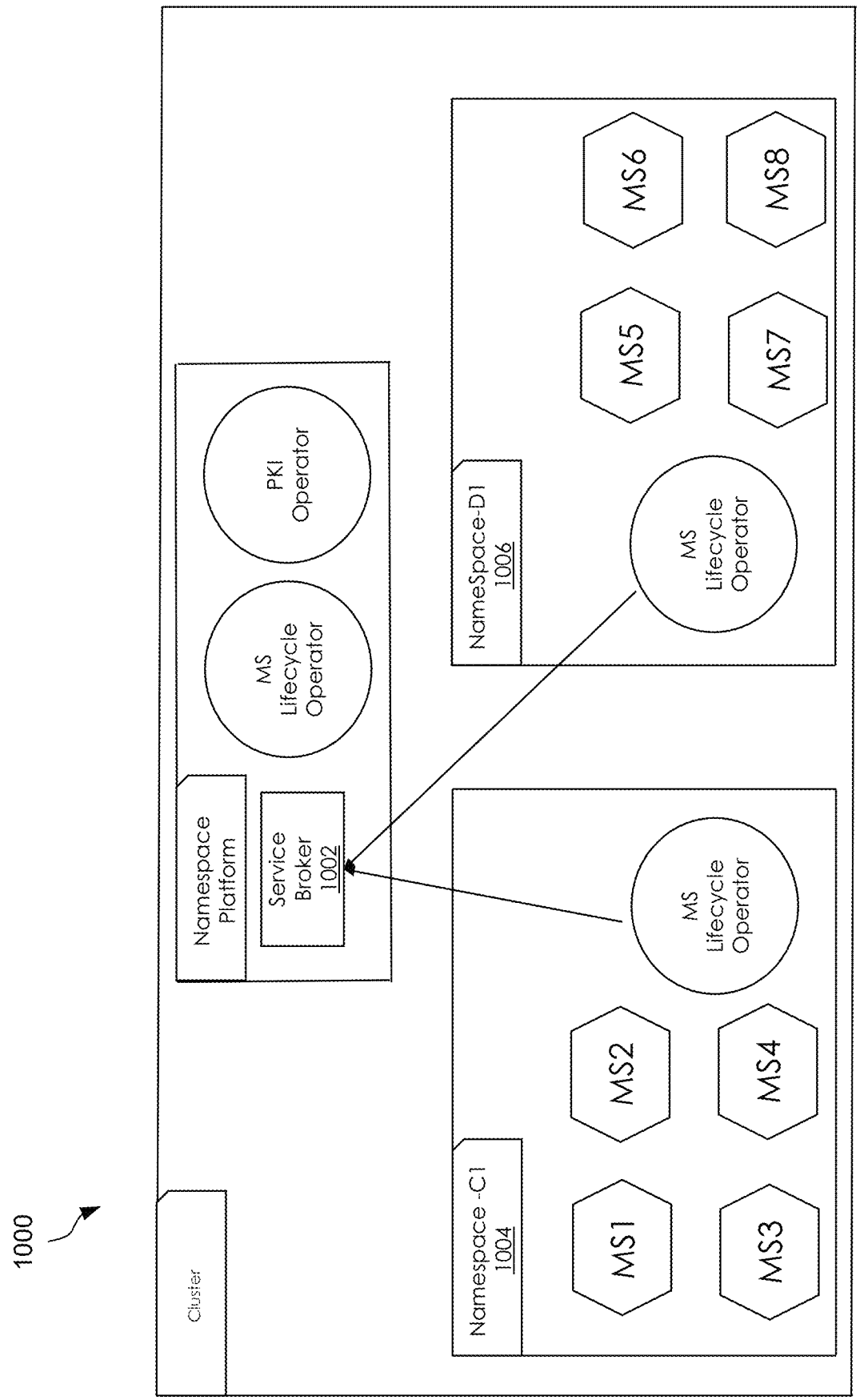
FIG. 10 illustrates a cluster-based deployment of a service broker, in accordance with one embodiment.

FIG. 10 illustrates a cluster-based deployment 1000 of a service broker, in accordance with one embodiment. As an option, the cluster-based deployment 1000 may be implemented in the context of the details of the previous figure and/or any subsequent figure(s). Of course, however, the cluster-based deployment 1000 may be implemented in the context of any desired environment. Further, the aforementioned definitions may equally apply to the description below.

In the present embodiment, a service broker 1002 is deployed within a namespace platform. As shown, the service broker 1002 is deployed to a cluster operating with a plurality of namespaces. For separate namespaces 1004, 1006 created by the namespace platform, each having a different subset of provisioned microservice instances, the microservice lifecycle operators specific to those namespaces 1004, 1006 communicate with, and therefore share, the service broker 1002. The service broker 1002 each interfaces the lifecycle operator to manage the lifecycle of the backing services.

Figure 11:
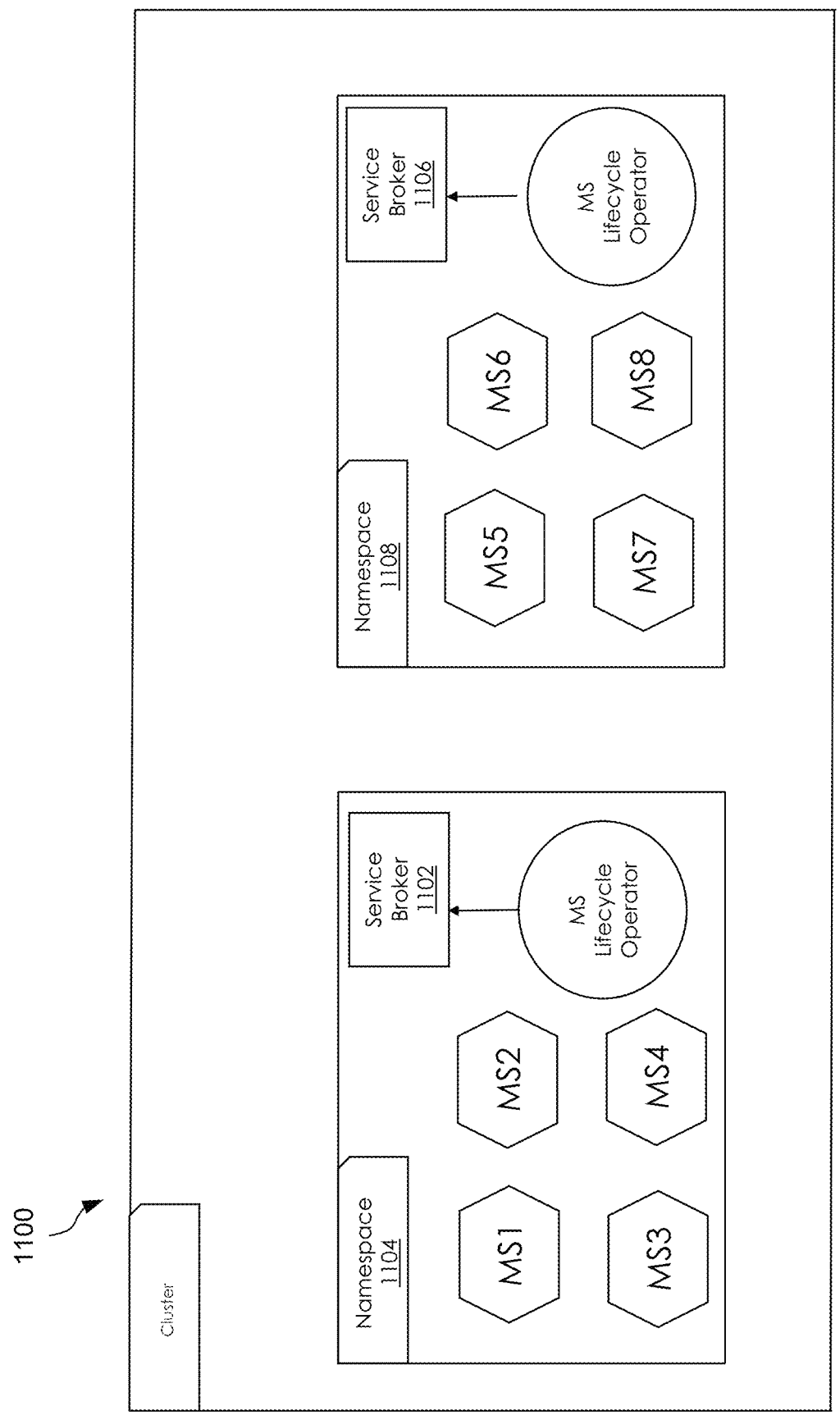
FIG. 11 illustrates a namespace-based deployment of a service broker, in accordance with one embodiment.

FIG. 11 illustrates a namespace-based deployment 1100 of a service broker, in accordance with one embodiment. As an option, the namespace-based deployment 1100 may be implemented in the context of the details of the previous figure and/or any subsequent figure(s). Of course, however, the namespace-based deployment 1100 may be implemented in the context of any desired environment. Further, the aforementioned definitions may equally apply to the description below.

In the present embodiment, service brokers are each deployed to a namespace. As shown, separate namespaces 1104, 1108 (each having a different subset of provisioned microservice instances) each have a respective service broker 1102, 1106 deployed thereto. The service brokers 1102, 1106 communicate with the microservice lifecycle operators specific to the respective namespaces to which they are deployed. The service brokers 1102, 1106 each interface the respective lifecycle operator of the namespace 1104, 1108 to manage the lifecycle of the subset of the backing services deployed to that namespace 1104, 1108.

Figure 12:
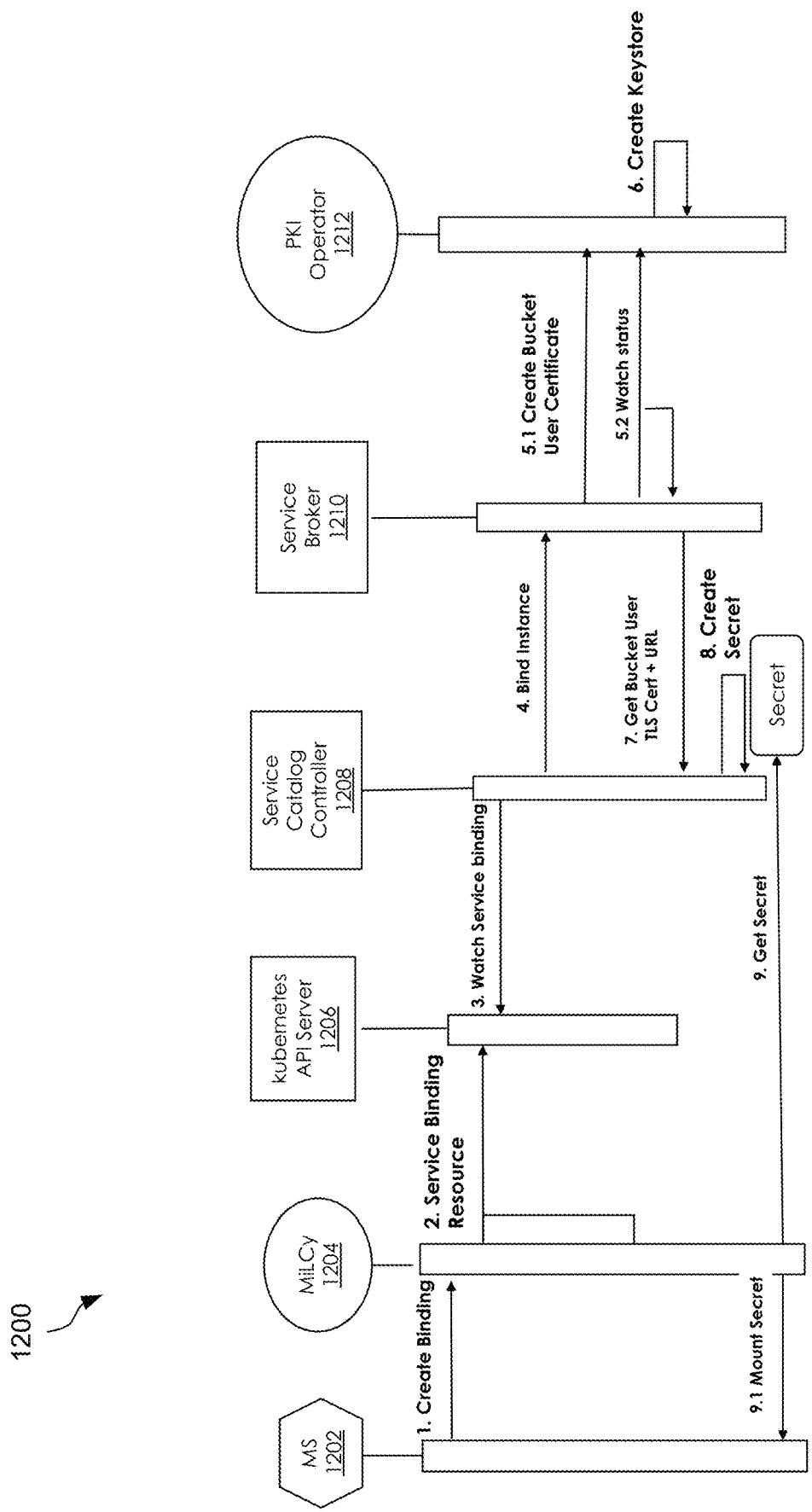
FIG. 12 illustrates a sequence flow diagram for using a service broker to provide Couchbase mutual Transport Layer Security (MTLS), in accordance with one embodiment.

FIG. 12 illustrates a sequence flow diagram 1200 for using a service broker to provide Couchbase mutual Transport Layer Security (MTLS), in accordance with one embodiment. As an option, the sequence flow diagram 1200 may be carried out in the context of the details of the previous figure and/or any subsequent figure(s). Of course, however, the sequence flow diagram 1200 may be carried out in the context of any desired environment. Further, the aforementioned definitions may equally apply to the description below.

In Step 1, a microservice 1202 sends a request for a binding to a MiLCy operator 1204. In Step 2, the MiLCy operator 1204 sends a request for a service binding resource to a Kubernetes API server 1206. In Step 3, the Kubernetes API server 1206 sets a watch for the service binding with a service catalog controller 1208. The service catalog controller 1208, in turn (Step 4), instructs a service broker 1210 to bind the service instance, which causes the service broker 1210 to creating a binding for the microservice.

In Step 5.1, the service broker 1210 uses a PKI operator 1212 to create a bucket user certificate. In Step 5.2, the service broker 1210 sets a watch status for the bucket user certificate. In Step 6, the PKI operator 1212 creates a keystore. In Step 7, the service catalog controller 1208 gets from the service broker 1210 the bucket user TLS certificate and URL. In Step 8, the service catalog controller 1208 creates a secret. In Step 9, the MiLCy operator 1204 gets the secret. In Step 9.1, the microservice 1202 mounts the secret.

Figure 13:
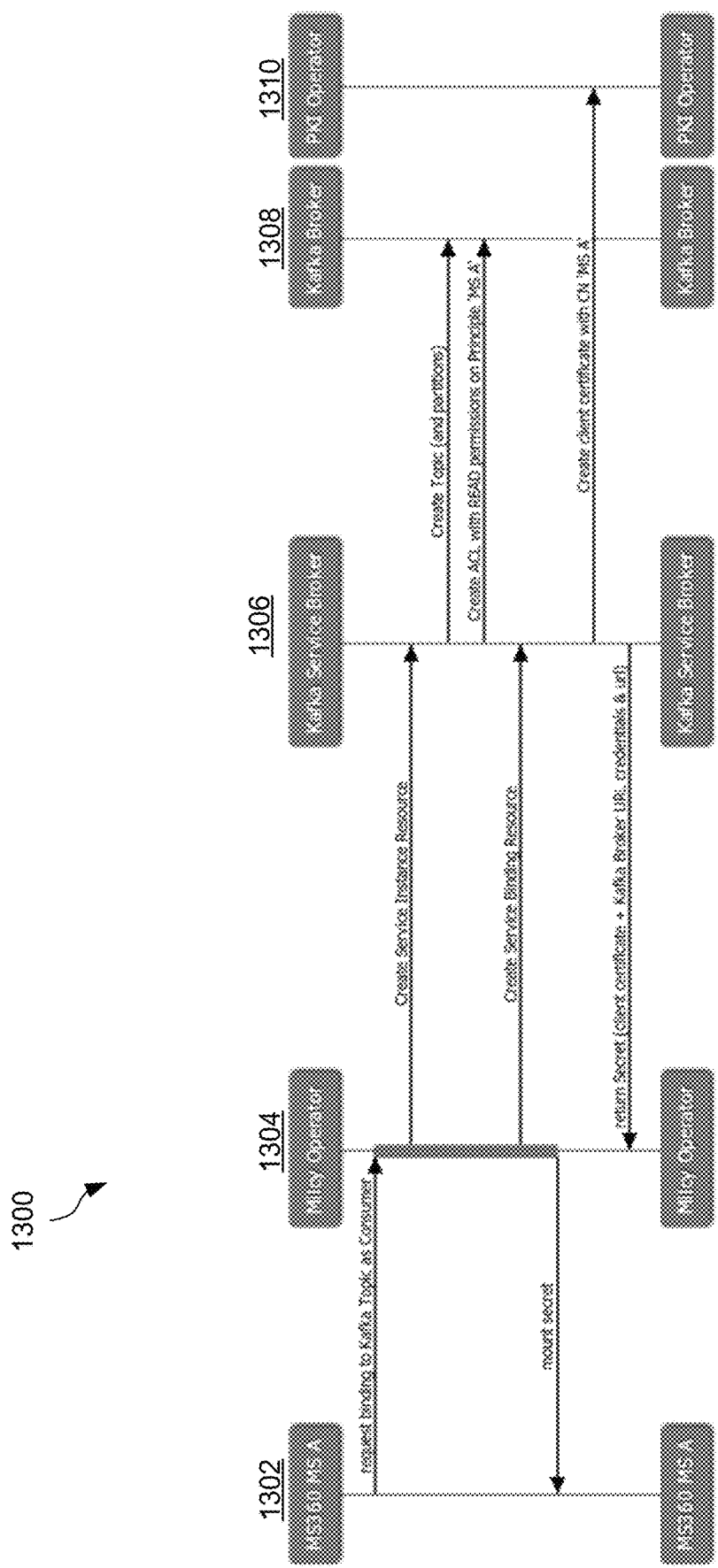
FIG. 13 illustrates a sequence flow diagram for using a service broker to provide Kafka authorization, in accordance with one embodiment.

FIG. 13 illustrates a sequence flow diagram 1300 for using a service broker to provide Kafka authorization, in accordance with one embodiment. As an option, the sequence flow diagram 1300 may be carried out in the context of the details of the previous figure and/or any subsequent figure(s). Of course, however, the sequence flow diagram 1300 may be carried out in the context of any desired environment. Further, the aforementioned definitions may equally apply to the description below.

A microservice 1302 requests a binding to a Kafka topic. A MiLCy operator 1304 requests creation of a new service instance. A service broker 1306 causes a broker 1308 to create the topic and partitions. The service broker 1306 also causes the broker 1308 to create an access control list with permissions on the microservice 1302. The MiLCy 1304 also instructs the service broker 1306 to create a service binding resource.

The service broker 1306, in turn, uses a PKI operator 1310 to create a client certificate for the microservice 1302. The service broker 1306 returns a secret (i.e. the client certificate, service broker 1306 URL credentials, and URL) to the MiLCy operator 1304. The MiLCy operator 1304 then mounts the secret on the microservice 1302.

Figure 14:
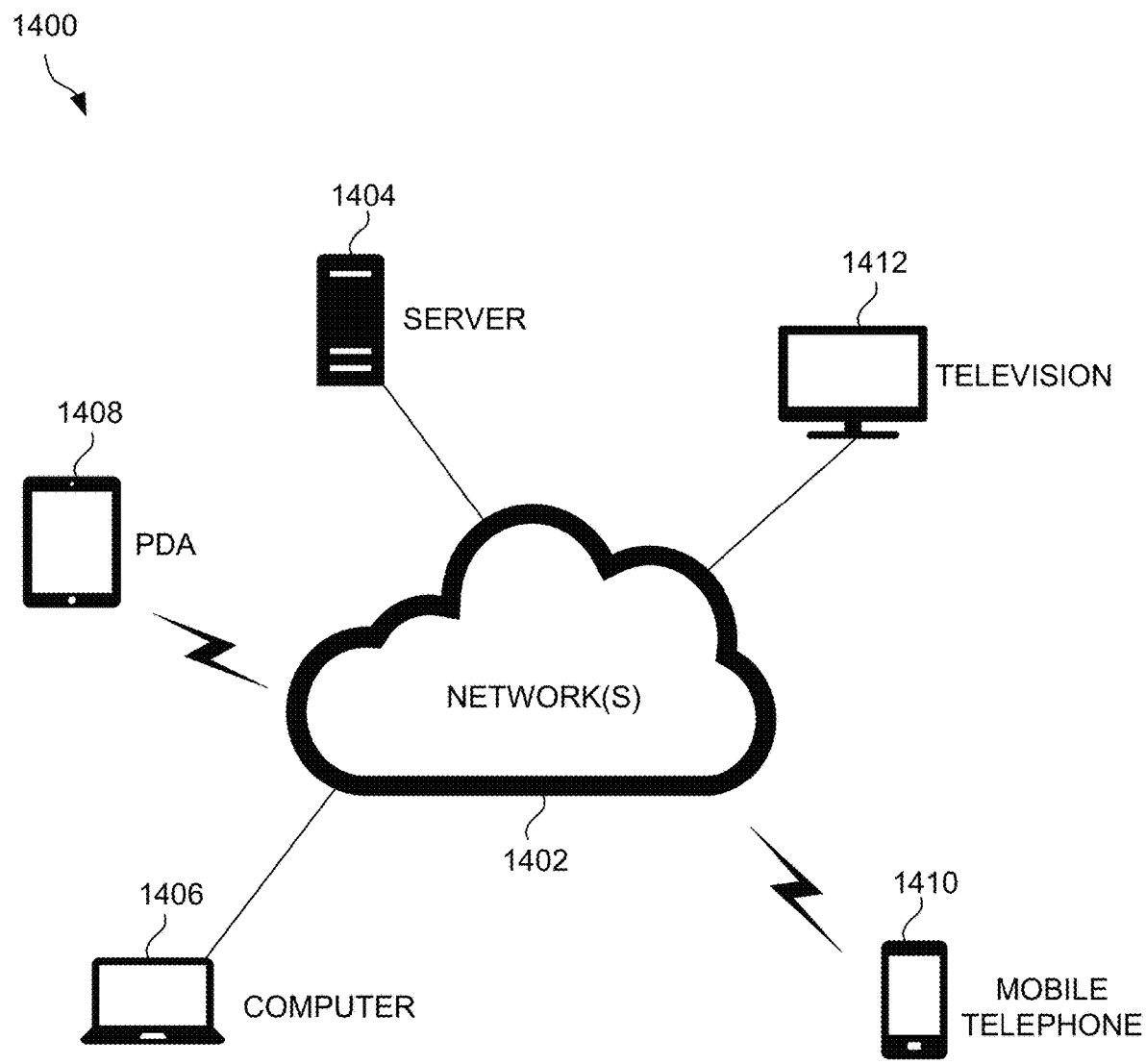
FIG. 14 illustrates a network architecture, in accordance with one possible embodiment.

FIG. 14 illustrates a network architecture 1400, in accordance with one possible embodiment. As shown, at least one network 1402 is provided. In the context of the present network architecture 1400, the network 1402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1402 may be provided.

Coupled to the network 1402 is a plurality of devices. For example, a server computer 1404 and an end user computer 1406 may be coupled to the network 1402 for communication purposes. Such end user computer 1406 may include a desktop computer, lap-top computer, and/or any other type of logic. Still yet, various other devices may be coupled to the network 1402 including a personal digital assistant (PDA) device 1408, a mobile phone device 1410, a television 1412, etc.

Figure 15:
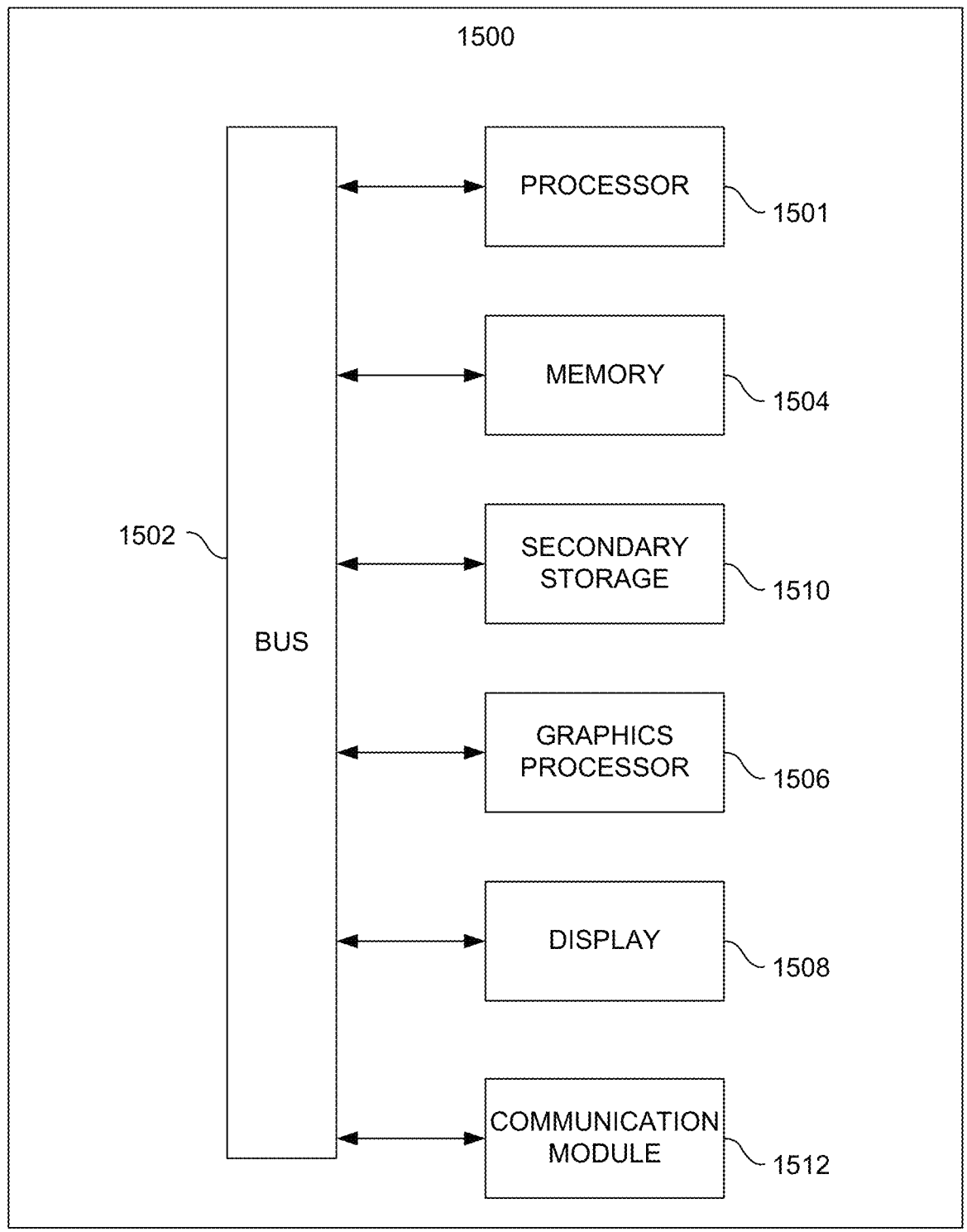
FIG. 15 illustrates an exemplary system, in accordance with one embodiment.

FIG. 15 illustrates an exemplary system 1500, in accordance with one embodiment. As an option, the system 1500 may be implemented in the context of any of the devices of the network architecture 1400 of FIG. 14. Of course, the system 1500 may be implemented in any desired environment.

As shown, a system 1500 is provided including at least one central processor 1501 which is connected to a communication bus 1502. The system 1500 also includes main memory 1504 [e.g. random access memory (RAM), etc.]. The system 1500 also includes a graphics processor 1506 and a display 1508.

The system 1500 may also include a secondary storage 1510. The secondary storage 1510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1504, the secondary storage 1510, and/or any other memory, for that matter. Such computer programs, when executed, enable the system 1500 to perform various functions (as set forth above, for example). Memory 1504, storage 1510 and/or any other storage are possible examples of non-transitory computer-readable media.

The system 1500 may also include one or more communication modules 1512. The communication module 1512 may be operable to facilitate communication between the system 1500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   provide a service catalog of backing services available for use by applications, wherein the service catalog provides functionality to list, provision, and bind with backing services;
   use one or more service brokers to manage a lifecycle of the backing services, including using the functionality provided in the service catalog to provision instances of the backing services, bind the instances of the backing services to the applications, and deprovision the instances of the backing services;
   wherein the one or more service brokers use a public key infrastructure operator to create a client certificate to provide to a microservice lifecycle operator for mounting the certificate for each of the applications that uses the backing services;
   wherein each of the one or more service brokers is deployed to a cluster operating with a plurality of namespaces each having a different subset of provisioned microservice instances and a specific micro service lifecycle operator, and wherein each of the one or more service brokers interface the specific microservice lifecycle operator in each of the plurality of namespaces to which the service broker is deployed to manage the subset of provisioned microservice instances included in the namespace.

2. The non-transitory computer-readable media of claim 1, wherein the service catalog is an extension application programming interface (API) that enables access to the backing services.

3. The non-transitory computer-readable media of claim 2, wherein the service catalog describes all of the backing services that can be provisioned through the one or more services brokers.

4. The non-transitory computer-readable media of claim 1, wherein the one or more service brokers are each an API configured to manage the lifecycle of a different subset of the backing services.

5. The non-transitory computer-readable media of claim 1, wherein the device is further caused to:
   use each of the one or more service brokers to generate, from the service catalog, a list of a subset of the backing services that the service broker offers.

6. The non-transitory computer-readable media of claim 1, wherein the one or more service brokers decouple the backing services from applications that use the backing services.

7. The non-transitory computer-readable media of claim 6, wherein the applications are microservices.

8. The non-transitory computer-readable media of claim 1, wherein the one or more service brokers each interface the lifecycle operator to manage the lifecycle of the backing services.

9. The non-transitory computer-readable media of claim 1, wherein a service catalog controller is provided as an interface between the service catalog and the one or more service brokers.

10. The non-transitory computer-readable media of claim 9, wherein the service catalog controller causes the one or more service brokers to provision the instances of the backing services.

11. A method, comprising:
    at a computer system:
    providing a service catalog of backing services available for use by applications, wherein the service catalog provides functionality to list, provision, and bind with backing services;
    using one or more service brokers to manage a lifecycle of the backing services, including using the functionality provided in the service catalog to provision instances of the backing services, bind the instances of the backing services to the applications, and deprovision the instances of the backing services;
    wherein the one or more service brokers use a public key infrastructure operator to create a client certificate to provide to a microservice lifecycle operator for mounting the certificate for each of the applications that uses the backing services;
    wherein each of the one or more service brokers is deployed to a cluster operating with a plurality of namespaces each having a different subset of provisioned microservice instances and a specific microservice lifecycle operator, and wherein each of the one or more service brokers interface the specific microservice lifecycle operator in each of the plurality of namespaces to which the service broker is deployed to manage the subset of provisioned microservice instances included in the namespace.

12. A system, comprising:
    a non-transitory memory storing instructions; and
    one or more processors in communication with the non-transitory memory that execute the instructions to:
    provide a service catalog of backing services available for use by applications, wherein the service catalog provides functionality to list, provision, and bind with backing services;
    use one or more service brokers to manage a lifecycle of the backing services, including using the functionality provided in the service catalog to provision instances of the backing services, bind the instances of the backing services to the applications, and deprovision the instances of the backing services;
    wherein the one or more service brokers use a public key infrastructure operator to create a client certificate to provide to a microservice lifecycle operator for mounting the certificate for each of the applications that uses the backing services;
    wherein each of the one or more service brokers is deployed to a cluster operating with a plurality of namespaces each having a different subset of provisioned microservice instances and a specific micro service lifecycle operator, and wherein each of the one or more service brokers interface the specific microservice lifecycle operator in each of the plurality of namespaces to which the service broker is deployed to manage the subset of provisioned microservice instances included in the namespace.

13. The non-transitory computer-readable media of claim 1, wherein the one or more service brokers notify the service catalog of each newly provisioned instance of the backing services.

14. The non-transitory computer-readable media of claim 13, wherein for each newly provisioned instance of the backing services created by one of the service brokers, the service catalog notifies a cluster operator that the newly provisioned instance of the backing services is ready, wherein the cluster operator operates a cluster for an application.

15. The non-transitory computer-readable media of claim 14, wherein the cluster operator communicates with the service catalog to bind the newly provisioned instance of the backing services to the application, wherein in turn the service catalog instructs the one of the service brokers to bind the newly provisioned instance to the application, and wherein the one of the service brokers sends connection information associated with the binding to the service catalog.

\* \* \* \* \*